Nov. 15, 1960     E. KRULL     2,959,882
FRAME STRUCTURES FOR RECEIVING TRANSPARENCIES
Filed May 26, 1959     3 Sheets-Sheet 1
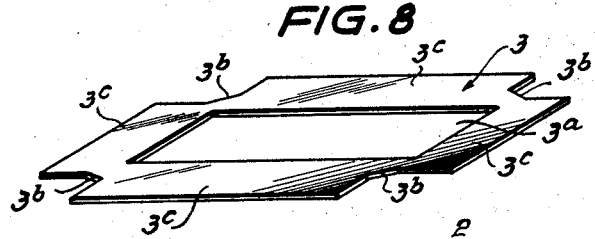
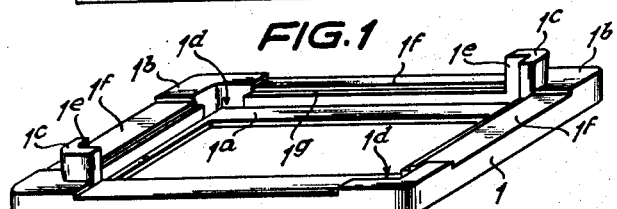
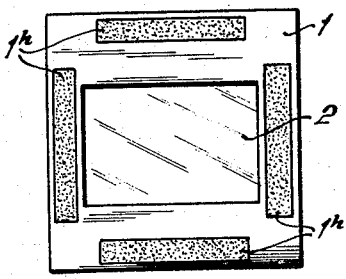
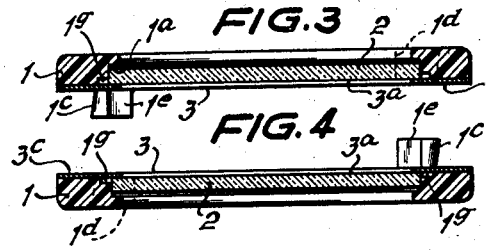
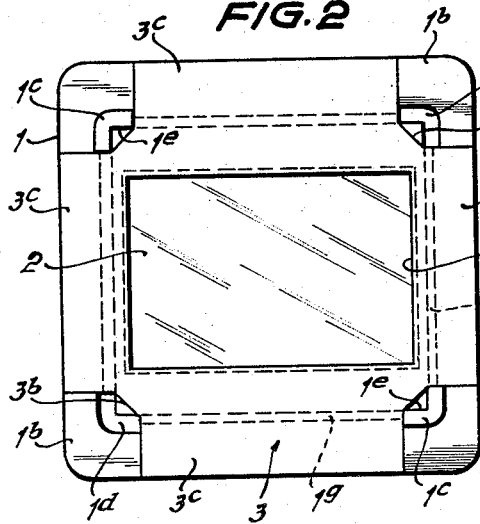
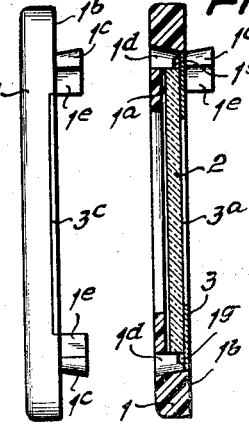
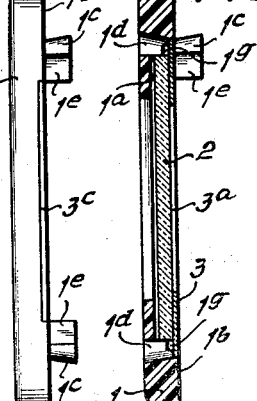

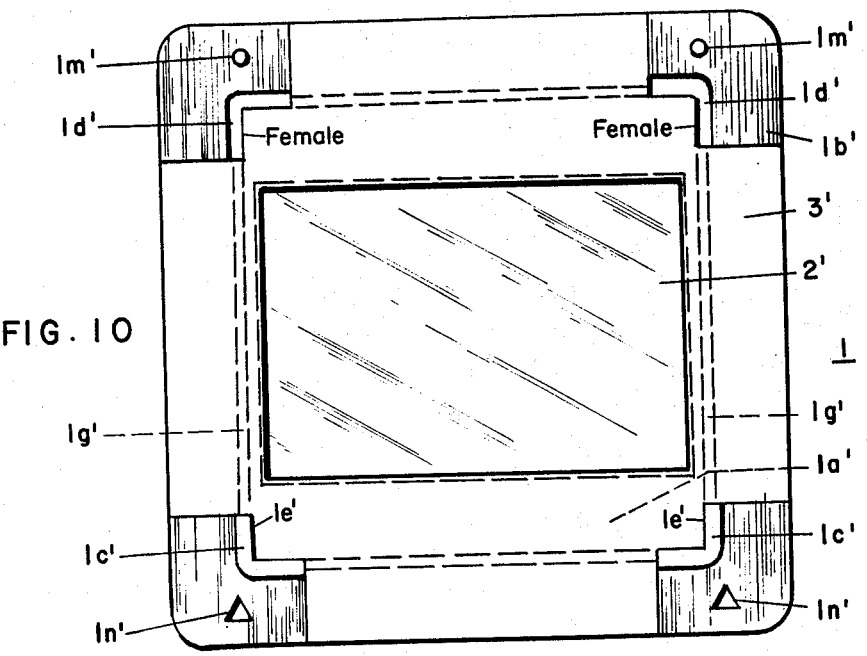
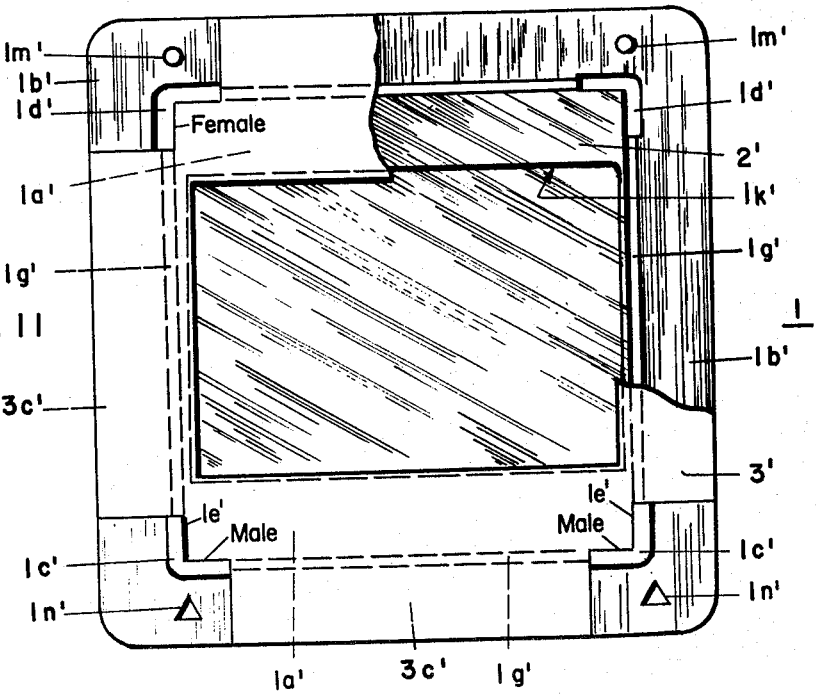

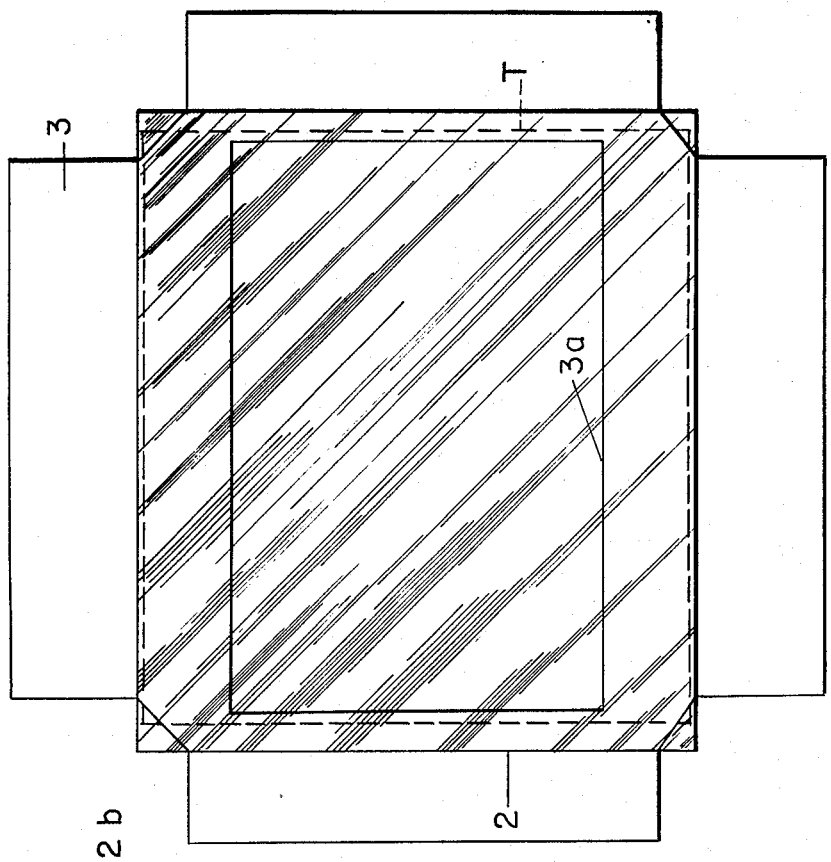
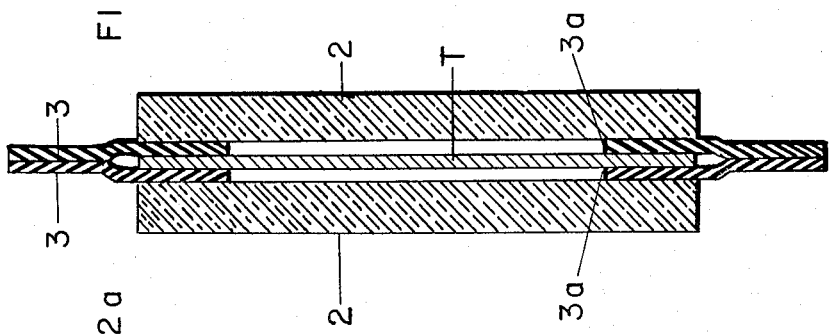

United States Patent Office 2,959,882
Patented Nov. 15, 1960

2,959,882
FRAME STRUCTURES FOR RECEIVING TRANSPARENCIES

Ernst Krull, Braunschweig, Germany, assignor to Filmosto-Projektion Johannes Jost, Essen, Germany, a firm Filed May 26, 1959, Ser. No. 816,018

10 Claims. (Cl. 40—152)

This invention has reference to frame structures for framing transparencies to be used as slides, and more particularly for framing transparencies of relatively small sizes as, for instance, the so-called 35 millimeter size or the 2¼ x 2¼″ size.

From a more limited point of view this invention has reference to frame structures for framing transparencies comprising plates of glass between which the transparencies are sandwiched to protect the surfaces thereof against damage, and particularly against scratching.

It is a general object of this invention to provide improved frame structures of the aforementioned character, and more particularly frame structures for receiving transparencies, which frame structures are made of a synthetic resin, or lend themselves to be made of a synthetic resin.

In prior art frame structures the cover glass for the transparency is generally loosely fitted into each of a pair of complementary frame portions adapted to be juxtaposed and held together by appropriate fastener means. One frame portion is placed upon the other preparatory to being secured to each other. There is a tendency for the cover glass which is but loosely held in the upper frame portion to drop out during the process of superimposing the same upon the lower frame portion. Generally a cover glass which drops out of one frame portion during the assembly of the composite frame structure is soiled, and must again be cleaned.

It is one object of this invention to provide frame structures for transparencies to be used as slides which are not subject to these limitations, or drawbacks.

It is another object of this invention to provide frame structures wherein the cover glasses for the transparencies are firmly held in position on each of the two complementary frame portions intended to form the composite frame structure for the transparency and cannot drop out during the process of assembly of the transparency and the two complementary frame portions.

Because of the tendency of cover glasses to drop out during the process of assembly some photographers initially sandwich their transparencies between two cover glass plates resting on a lower frame portion, and thereafter superimpose a complementary upper frame portion on said lower frame portion and the cover glasses between which the transparency has been pre-sandwiched. This technique requires a fair degree of skill and results in finger marks on the cover glass, or at least on the upper cover glass, which must be removed when the binding or framing process is completed.

It is another object of this invention to provide frame structures for transparencies requiring no or but little skill for framing or mounting the transparencies, and not involving the danger of leaving any finger marks on the cover glasses thereof.

In prior art frame structures the correct placement of the transparency on the lower frame portion and the proper insertion of the cover glass into the upper frame portion requires a fairly high degree of manual skill.

It is, therefore, another object of this invention to provide frame structures for mounting transparencies which do not require such critical manual operations.

Prior art frame structures for mounting transparencies of the type comprising protective cover glasses are relatively expensive to manufacture because they involve two different complementary frame portions.

It is, therefore, another object of this invention to provide frame structures for mounting transparencies which are made up of two identical complementary frame portions whereby the cost of manufacture is drastically reduced.

The thickness of cover glasses is never entirely uniform, i.e. the thickness of cover glasses involves substantial tolerances. Because of the presence of such tolerances prior art frame structures for framing transparencies provide generally for a relatively loose fit of the cover glasses in the frame structure. As a result the transparencies are subject to a slight lateral movement in a transversal direction, and thus the relation between the frame structure and the plane of the transparencies is never defined with a sufficient high degree of precision. For this reason it is generally necessary to refocus the projector whenever a slide is changed.

It is, therefore, another object of the invention to provide composite frame structures for transparencies wherein the cover glasses are not loose, wherein the plane of the transparency is defined with a high degree of precision, and which do not require refocusing of the projector whenever a slide is changed.

The loose fit of the cover glasses in conventional frame structures for framing transparencies gives particles of dust access to the parts inside the frame structure from where the particles can not be readily removed, and where they tend to impair the sight of the picture when the slide is being projected.

It is, therefore, another object of this invention to provide dust-proof or dust-tight frame structures for transparencies.

Conventional or prior art frame structures for framing transparencies require the transparency to be placed into the frame structure in a predetermined fashion in order to be correctly projected when the frame structure is placed into a projector.

It is, therefore, another object of this invention to provide frame structures adapted to receive transparencies into which the transparency may be placed without following any rule as to positioning of the transparency and which frame structures are adapted to be marked with the transparency mounted therein to indicate the way in which the frame structure must be inserted into a projector for correct position of the transparency.

The foregoing and other general and special objects of the invention and advantages thereof will appear more clearly from the ensuing particular description of two preferred embodiments of the invention, as illustrated in the accompanying drawings, wherein:

Fig. 1 is an isometric view of one of the two identical frame portions of which the complete composite frame is made up;

Fig. 2 is a top plan view of the structure shown in Fig. 1;

Fig. 3 is a section taken along 3—3 of Fig. 2;

Fig. 4 shows an upper complementary frame portion in registry with the lower frame portion of Fig. 3 in the process of being superimposed upon the lower frame portion, the upper frame portion being shown in a section taken along the same plane as Fig. 3;

Fig. 5 is a side elevation of the structure shown in Fig. 2 seen in the direction of the arrow R;

Fig. 6 is a section along 6—6 of Fig. 2;

Fig. 7 is an isometric view of one of the cover glasses used for protecting transparencies inserted into a frame structure embodying this invention;

Fig. 8 is an isometric view of a mask adapted to support the cover glass according to Fig. 7;

Fig. 9 is an elevation of the front of the frame portion whose rear view is shown in Fig. 2;

Figs. 10 and 11 are views similar to that of Fig. 2 of two complementary frame portions of a modified embodiment of the invention; and Figs. 12a and 12b show on a large scale details of the structure shown in other figures.

The frame structure comprises two identical frame portions to which numeral 1 has been applied to generally indicate these frame portions. Frame portions 1 are preferably made of a suitable synthetic resin. Frame portions 1 each define a rectangular aperture 1k. Each of the frame portions 1 forms a rectangular shoulder 1a surrounding aperture 1k intended to receive the cover glass 2. As seen in Fig. 2 shoulder 1a is relatively wide on two sides of frame portions 1 and relatively narrow on the two other sides of frame portion 1. Cover glasses 2 cover apertures 1k. Each frame portion 1 is associated with a flexible mask 3 in sheet-form as, for instance, of paper. Masks 3 are bonded to the inner surfaces 1b of frame portions 1. This may be effected, for instance, by means of a suitable adhesive. Each cover glass 2 is bonded at least along two sides thereof to one of the two masks 3 and each cover glass 2 is floatingly supported on one of the two frame portions 1 by one of the two masks 3. The sides of rectangular cover glasses 2 bonded to masks 3 are the relatively long sides of cover glasses 2. Each frame portion 1 supporting a cover glass 2 by means of a mask 3 forms a subassembly. A pair of complementary identical subassemblies 1, 2, 3 may be used to frame a transparency by superimposing the two subassemblies as indicated in Figs. 3 and 4, and also shown in Figs. 12a and 12b.

The inner sides of masks 3 are coated with a dry type pressure-responsive adhesive, i.e. an adhesive which does not need to be moistened to become effective. The inner sides of masks 3 which are coated in this fashion must be protected by an overlay (not shown) of paper or the like to prevent sticking before it is intended to join together the two complementary subassemblies shown in Figs. 3 and 4. The transparency to be mounted is placed between the two complementary subassemblies 1, 2, 3 before the same are joined together and the aforementioned overlay is removed from the juxtaposed surfaces of masks 3 before the same are brought together and joined permanently by adhesive action. When the layers of adhesive on the inner juxtaposed surfaces of masks 3 are used to cement masks 3 to each other, the transparency which has been framed in the frame structure is effectively sealed off from the outer atmosphere, safely precluding the access of any particle of dust to it.

It will be understood that use of a dry-type pressure-responsive adhesive on the insides of masks 3 is preferable to any other kind of adhesives, but that other kinds of adhesives may be used for the purpose in hand, if desired.

In the embodiment of the invention shown in the drawings the two subassemblies 1, 2, 3 are held together, in addition to the action of the adhesive on the inside of the masks 3 thereof, by the action of cooperating male and female fasteners. Referring more particularly to Fig. 1, the frame portion 1 shown therein comprises two male fasteners or pegs 1c and two recesses 1d forming female fasteners. The male fasteners are arranged adjacent to each of the ends of a diagonal that may be drawn across the inner surface of frame portion 1. The recesses 1d forming female fasteners are arranged adjacent to each of the ends of another diagonal that may be drawn across the inner surface of frame portion 1. This geometry of fasteners allows to join together two frame portions which are identical to that shown in Fig. 1 by registering the male fasteners 1c in the upper frame portion 1 with the recesses 1d in the lower frame portion 1 and by registering the recesses 1d in the upper frame portion 1 with the male fasteners 1c in the lower frame portion 1. The fact that the upper and the lower frame portions are identical results in substantial savings in the cost of tools since one single mold may be used for manufacturing the constituent parts of the frame structure instead of two molds, as was necessary when manufacturing prior art frame structures of synethic resins or plastics for receiving transparencies and cover glasses therefor. It will be apparent from the drawings that male fasteners 1c and the female fasteners 1d are in the shape of frustrated cones, i.e. form undercut surfaces which enhance their fastening action. The male fasteners 1c form a pair of rertangular abutments or abutment surfaces 1e for securely positioning the transparency to be placed into the frame structure.

The masks 3 have a rectangular cut-out 3a which exposes the transparency to view and the borders 3c of masks 3 rest on and are bonded to the inner surfaces 1b of frame portions 1. The corner regions of masks 3 are cut off, or punched off, in order to expose fasteners 1c, 1d, i.e. not to stand in the way when it is intended to join fasteners 1c, 1d. Reference numerals 3b have been applied to indicate the cut-off corner regions of masks 3.

Each of the frame portions 1 defines at the inner surface 1b thereof four rectangular shallow recesses 1f having substantially the same depth as the thickness of masks 3 and adapted to receive masks 3 or, to be more specific, to receive the borders 3c of masks 3. Thus the inner surfaces of masks 3 lie flush with the inner surfaces 1b of frame portions 1, and the masks prevent small particles of dust from entering or penetrating into the inside of the frame structure. A mask fitted in this fashion into each complementary frame portion 1 would establish a dust-tight seal even without being bonded or glued to the inside 1b of frame portion 1. The adhesive bonds between the inner surfaces of frame portions 1 and the outer surfaces of masks 3 are, however, necessary for reasons of mechanical strength, and the adhesive bond between the engaging inner surfaces of masks 3 is necessary to establish an absolutely dust-tight seal between the inner surfaces of masks 3, i.e. a seal whose effectiveness does not depend on the amount of pressure with which these surfaces are pressed upon each other.

As mentioned above, each of the frame portions 1 defines a rectangular shoulder 1a for positioning cover glass 2. Each frame portion 1 defines at the inner surface thereof an entrance 1g for placing cover glass 2 upon shoulder 1a. The size of entrance 1g exceeds the size of shoulder 1a where it is largest to allow each mask 3 to be readily flexed in transverse direction, i.e. substantially at right angles to the plane generally defined by frame portions 1. Such flexing occurs when a transparency is sandwiched between the two juxtaposed masks 3 of a frame structure 1. It will be apparent that with this kind of frame structures the position of the transparency in regard to the frame structure is well defined and does in no way depend upon the thickness of the cover glasses and alter as the thickness of the cover glasses changes due to the occurrence of tolerances. Hence this type of frame structures does not require any refocusing of the projector with each change of a slide.

Referring now more particularly to Fig. 9, the outer surface of frame portion 1 has four areas 1h situated in a plane slightly differing from the general plane of said surface. Each area 1h is situated adjacent to one of the four edges of frame portion 1. Areas 1h are intended to receive a mark indicating in which way the slide or frame structure is supposed to be inserted into the projector. When binding or framing a transparency the latter may be inserted into the frame structure in any desired way as long as it is positioned by abutments 1e. Whether the sensitized or nonsensitized side of the film is upside or down, or whether the transparency is inverted or not, does not make any difference at the time the transparency is being bound. Each position which may be given to transparency during binding is a correct position. All that is needed after binding has been completed is to indicate on the outside of the frame in which way the latter is to be inserted into the projector. This can readily be achieved by the eight marking areas 1h of which four are associated with each frame portion 1, and of which one is associated with each edge of each frame portion 1. Areas 1h are preferably slightly recessed and their surfaces are preferably roughened.

Fig. 12 is a cross-section through the pair of glass plates or cover glasses 2 sandwiching a transparency to which reference character T has been applied. Transparency T has substantially the same shape and size as glass plates or cover glasses 2 and adheres to the inner surfaces of flexible masks 3 coated with a pressure responsive dry-type adhesive. The pegs or male fasteners 1c shown in Figs. 1 to 6 form guides for the transparency T helping to achieve proper alignment or positioning of the latter with regard to the rectangular cut-outs 3a in masks 3. Fig. 12b shows the same parts as Fig. 12a, the former being a front elevation.

In Figs. 10 and 11 the same reference characters as in Figs. 1–9 have been applied to indicate like parts, except that a prime sign has been added to each reference character. Thus 1' has been applied to indicate two complementary frame portions, 2' to indicate two cover glasses and 3' to indicate two cover-glass-supporting masks. Because of the general similarity of the structure of Figs. 10 and 11 with that previously described the former does not call for a detailed description. The structure of Figs. 10 and 11 differs from that of Figs. 1–9 in that additional fastener means supplement the combined fastener and abutment means for positioning the transparency. As shown in Figs. 10 and 11 each frame portion 1' is provided with two pegs 1c' which fit into a pair of cooperating holes 1d' in the complementary identical frame portion 1'. Pegs 1c' form abutments 1e' for positioning the transparency inside the frame structure or slide. Each frame portion is further provided with two additional round pegs 1m' which project beyond the general plane of the inner surface of the respective frame portion 1' and each frame portion 1' is provided with two triangular recesses 1n' adapted to receive round pegs 1m'.

It will be apparent from the foregoing that the two complementary frame portions 1', 2' are held together (1) by the adhesive coats on the inner surfaces of masks 3' and (2) by cooperating male and female fastener means. The adhesive bond between the inner surfaces of the two masks safely precludes any access of particles of dust to the slide. The cooperating male and female fastener means are added as an auxiliary means to relieve the adhesive bond between the inner surfaces of masks 3' from stresses tending to separate masks 3' and complementary frame portions 1'.

It will be understood that I have illustrated and described herein preferred embodiments of my invention, and that various alterations may be made in the details thereof without departing from the spirit and scope of the invention as defined in the appended claims.

I claim:

1. A frame structure for framing transparencies comprising a pair of complementary frame portions having inner surfaces adapted to be juxtaposed, each of said pair of frame portions having an aperture to be covered by a cover glass; fastener means for maintaining said pair of frame portions in juxtaposed position to form a unitary frame structure; a pair of flexible masks in sheet-form each bonded to the inner surface of one of said pair of frame portions, a pair of cover glasses each bonded to one of said pair of masks and each floatingly supported on one of said pair of frame portions by one of said pair of masks, and a layer of an adhesive substance on the inner juxtaposed surfaces of each of said pair of masks for sealing transparencies framed in said frame structure from the outer atmosphere.

2. A frame structure for framing transparencies comprising a pair of identical complementary frame portions of a synthetic resin, said pair of frame portions having a pair of inner surfaces adapted to be juxtaposed, each of said pair of frame portions defining an aperture to be covered by a cover glass, each of said pair of inner surfaces having a pair of male fasteners each adapted to frictionally engage one of a pair of female fasteners, each of said pair of inner surfaces defining a pair of recesses forming a pair of female fasteners each adapted to be frictionally engaged by one of said pair of male fasteners on the other of said pair of inner surfaces; a pair of flexible masks in sheet-form each bonded to one of said pair of inner surfaces on one of said pair of frame portions; and a pair of cover glasses each bonded at least along two sides thereof to one of said pair of masks and each floatingly supported on one of said pair of inner surfaces by one of said pair of masks, each of said pair of masks being coated on the inside thereof with a dry-type pressure-responsive adhesive.

3. A frame structure for framing transparencies comprising a pair of complementary frame portions having inner surfaces adapted to be juxtaposed, each of said pair of frame portions having on the outer surface thereof a rectangular aperture to be covered by a cover glass, each of said pair of frame portions defining a shoulder for positioning said cover glass, and each of said pair of frame portions defining at the inner surface thereof an entrance for placing said cover glass upon said shoulder; cooperating male and female fastener means on said inner surfaces for maintaining said pair of frame portions in juxtaposed position to form a unitary frame structure; a pair of flexible masks in sheet form each bonded to the inner surface of one of said pair of frame portions; a pair of cover glasses each bonded to one of said pair of masks and each floatingly supported on one of said pair of frame portions by one of said pair of masks; the size of said entrance exceeding the size of said shoulder to allow said pair of masks to be readily flexed in a tranverse direction, and a layer of a dry-type pressure-responsive adhesive on the inner juxtaposed surfaces of each of said pair of masks for joining said inner surfaces of said pair of masks.

4. A frame structure for framing transparencies comprising a pair of identical complementary frame portions of a synthetic resin, each of said pair of frame portions having on the outer surface thereof a rectangular aperture to be covered by a cover glass, each of said pair of frame portions defining a shoulder for positioning said cover glass; fastener means for maintaining said pair of frame portions in juxtaposed position to form a unitary frame structure, said fastener means including a pair of rectangular abutments for positioning the transparency to be received by said frame structure projecting from the inner surface of each of said pair of frame portions, and a pair of rectangular recesses formed on the inner surface of each of said pair of frame portions each adapted to receive one of said pair of rectangular abutments on the other of said pair of frame portions; a pair of flexible masks in sheet-form each bonded to the inner surface of one of said pair of frame portions, a pair of cover glasses each bonded to one of said pair of masks and each floatingly supported on one of said pair of frame portions by one of said pair of masks, and a layer of dry-type pressure-responsive adhesive on the inner juxtaposed surfaces of each of said pair of masks for joining said inner surfaces of said pair of masks.

5. A frame structure for framing transparencies comprising a pair of identical complementary frame portions of synthetic resin having inner surfaces adapted to be juxtaposed, each of said pair of frame portions having on the outer surface thereof a rectangular aperture to be covered by a cover glass; fastener means for maintaining said pair pair of frame portions in juxtaposed position to form a unitary frame structure, said fastener means including a pair of pegs on each of said pair of frame portions and a pair of peg-receiving recesses on each of said pair of frame portions, each of said pair of pegs defining a pair of rectangular abutments for positioning the transparency to be received by said frame structure; a pair of flexible masks in sheet-form each bonded to the inner surface of one of said pair of frame portions; a pair of cover glasses each bonded along two sides thereof to one of said pair of masks and each floatingly supported on one of said pair of frame portions by one of said pair of masks, and a layer of an adhesive substance on the inner juxtaposed surfaces of each of said pair of masks for sealing transparencies framed in said frame structure from the outer atmosphere.

6. A frame structure for framing transparencies comprising a pair of complementary frame portions having inner surfaces adapted to be juxtaposed, each of said pair of frame portions having an aperture to be covered by a cover glass; fastener means for maintaining said pair of frame portions in juxtaposed position to form a unitary frame structure; rectangular abutment means for positioning the transparency to be received by said frame structure; said fastener means and said abutment means comprising cooperating male and female surfaces and being confined substantially to the corner regions of the inner surfaces of said pair of frame portions; a pair of flexible masks in sheet-form each bonded to the inner surface of one of said pair of frame portions, each of said pair of masks having cut-outs at the corner regions thereof to expose said fastener means and said abutment means; a pair of cover glasses each bonded to one of said pair of masks and each floatingly supported on one of said pair of frame portions by one of said pair of masks, and a layer of an adhesive substance on the inner juxtaposed surfaces of each of said pair of masks for sealing transparencies framed in said frame structure from the outer atmosphere.

7. A frame structure for framing transparencies as specified in claim 6 wherein each of said pair of frame portions defines at the inner surface thereof recesses having substantially the same depth as the thickness of each of said pair of masks and adapted to receive one of said pair of masks.

8. A frame structure for framing transparencies comprising a pair of complementary identical frame portions having inner surfaces adapted to be juxtaposed, each of said pair of frame portions having an outer surface bounded by four edges and defining an aperture to be covered by a cover glass, and each of said pair of frame portions having on said outer surface thereof four areas situated in a plane slightly differing from the general plane of said outer surface, and each of said four areas being situated adjacent one of said four edges of said outer surface; fastener means for maintaining said pair of frame portions in juxtaposed position to form a unitary frame structure; a pair of flexible masks in sheet-form each bonded to the inner surface of one of said pair of frame portions, a pair of cover glasses each bonded to one of said pair of masks and each floatingly supported on one of said pair of frame portions by one of said pair of masks, and a layer of a dry-type pressure-responsive adhesive on the inner juxtaposed surfaces of each of said pair of masks for joining said inner surfaces of said pair of masks.

9. A subassembly for framing tranparencies comprising a frame plate of a plastic material having a first surface and an opposite second surface and defining a rectangular opening, said second surface including a rectangular recessed shoulder immediately adjacent said opening; a rectangular glass plate of the same shape as said shoulder of said frame plate, said glass plate having a first surface abutting against said shoulder of said frame plate and an opposite second surface; and a flexible sheet support for said glass plate having a rectangular opening conforming substantially with the shape of said opening in said frame plate, said support having a first surface bonded to said second surface of said frame plate and to said second surface of said glass plate, and said support having a second surface opposite to said first surface thereof and coated with an adhesive medium for bonding said second surface of said flexible sheet support to a like flexible sheet support on another substantially identical subassembly.

10. A subassembly for framing transparencies comprising a frame plate of a plastic material having a first surface and an opposite second surface and defining a rectangular opening, said second surface including a recessed rectangular shoulder immediately adjacent said opening and a portion more remote from said opening provided with male and female fastener means adapted to cooperate with like fastener means in a like frame plate; a rectangular glass plate having a first surface abutting against said shoulder of said frame plate and an opposite second surface; and a mask in the form of a flexible sheet having a rectangular opening substantially in registry with said rectangular opening in said frame plate, said mask having a first surface bonded to said second surface of said frame plate and to said glass plate, and said mask having a second surface opposite to said first surface thereof and coated with a dry-type pressure-responsive adhesive for bonding said second surface of said mask to a like mask on another substantially identical subassembly.

References Cited in the file of this patent

UNITED STATES PATENTS

| | | |
|---|---|---|
| 2,505,250 | Kime | Apr. 25, 1950 |
| 2,841,903 | Christensen | July 8, 1958 |
| 2,867,927 | Schwartz | Jan. 13, 1959 |